United States Patent Office 3,452,512
Patented July 1, 1969

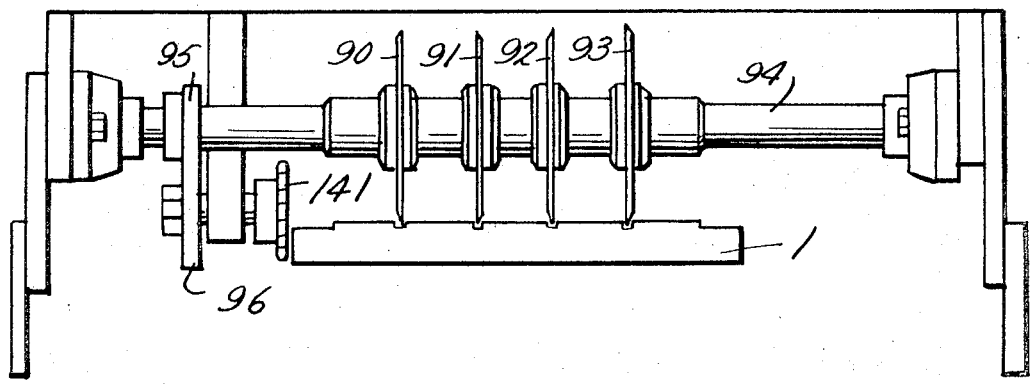
Fig. 5.
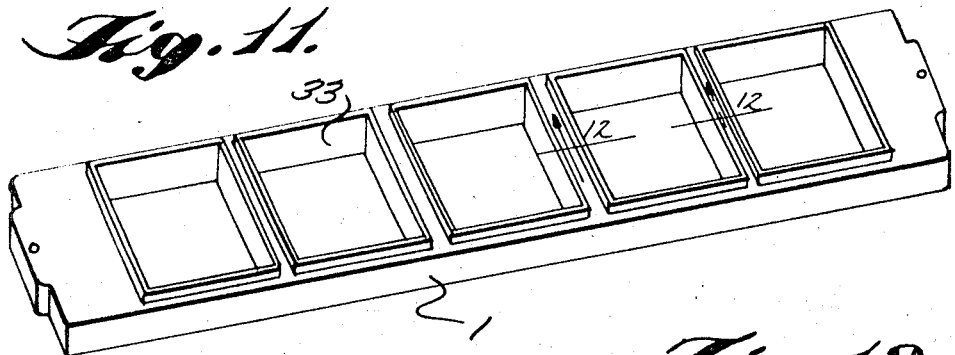
Fig. 11.
Fig. 12.
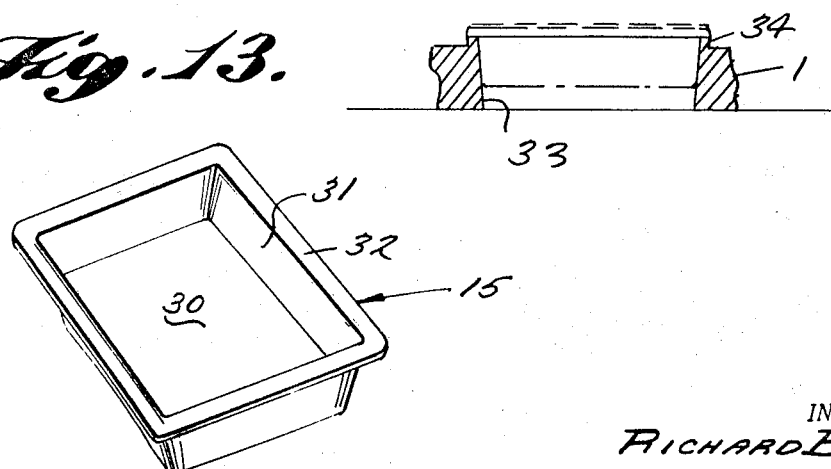
Fig. 13.
INVENTOR.
RICHARD B. INMAN
BY
Cushman, Darby & Cushman
ATTORNEYS

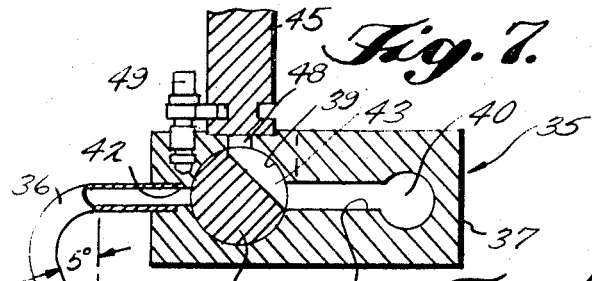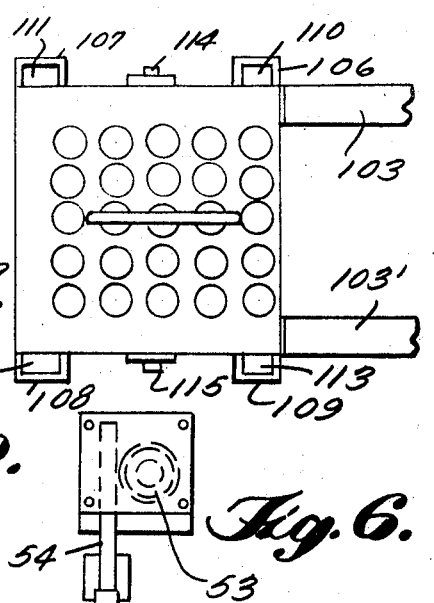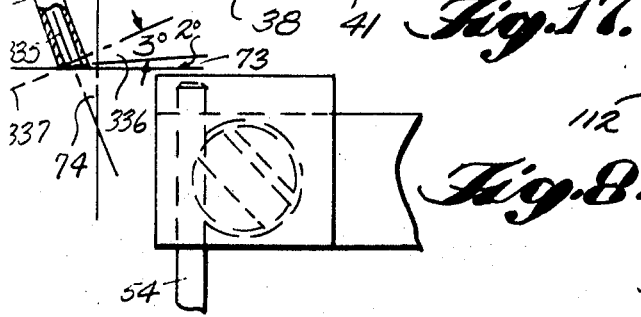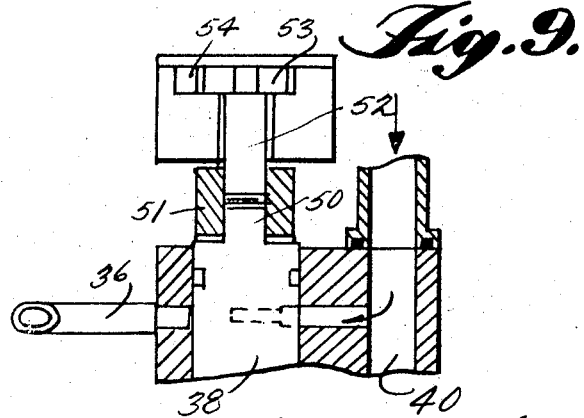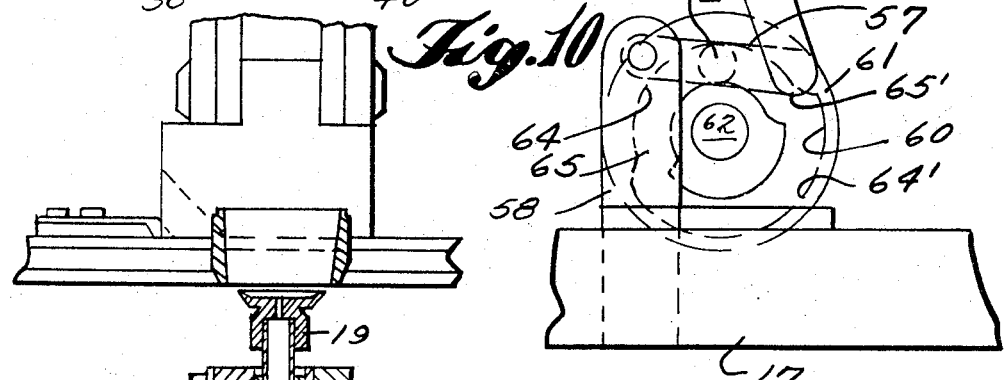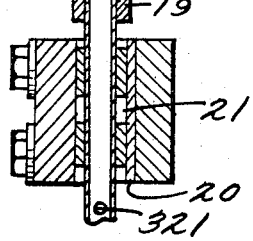

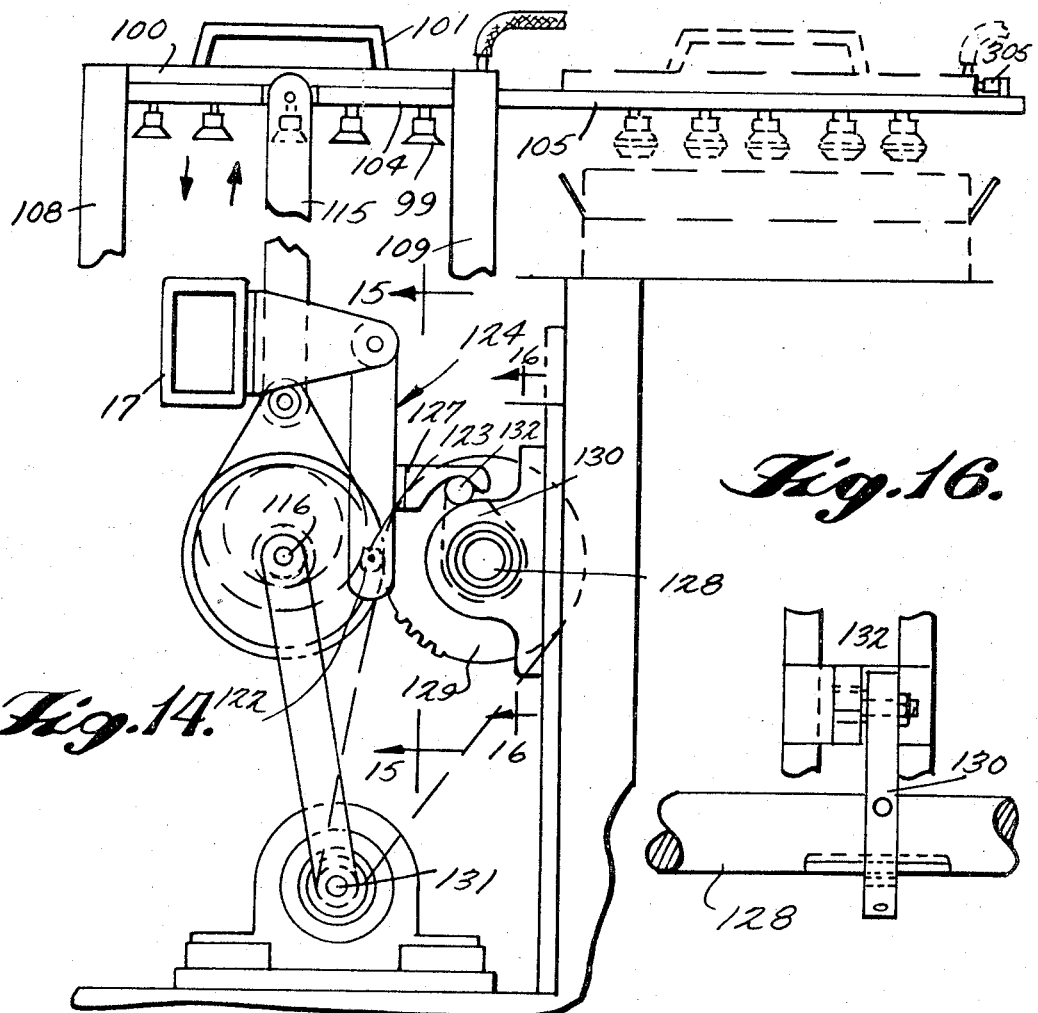
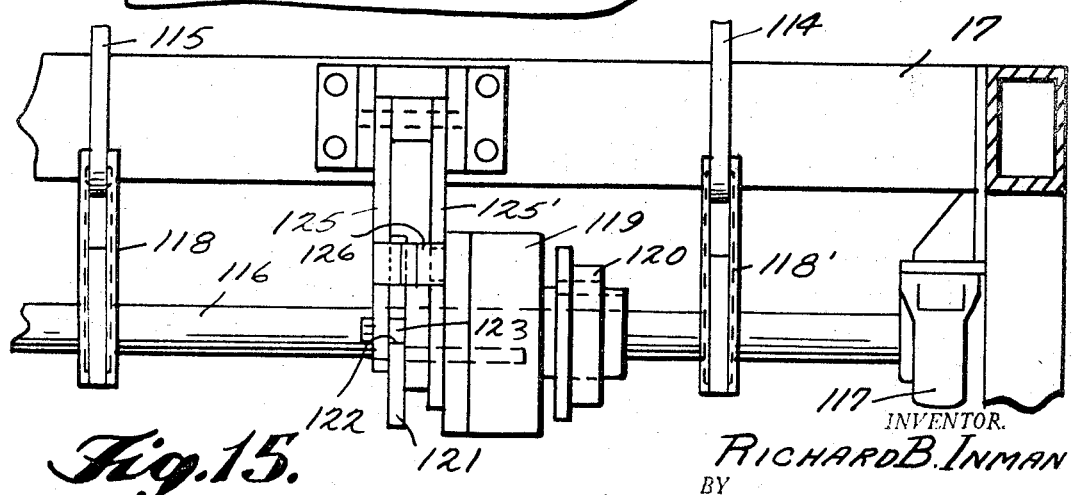

3,452,512
APPARATUS FOR PACKAGING
Richard B. Inman, Dunwoody, Ga., assignor to Scientific-Atlanta, Inc., Atlanta, Ga., a corporation of Georgia
Filed Jan. 3, 1967, Ser. No. 606,927
Int. Cl. B65b 1/00, 3/00, 7/28
U.S. Cl. 53—282         3 Claims

ABSTRACT OF THE DISCLOSURE

Apparatus for filling preformed receptacles and sealing a cover over the filled receptacles. Small preformed receptacles are transported in groups past a filling station, the group is covered by a sheet of a foil, the foil is hermetically sealed, for example by heat, to the receptacles, a cutting means severs the covering between the receptacles, then several of the aforesaid groups are allowed to accumulate at a discharge station. When an appropriate number of groups are accumulated, the closed packages are collectively removed from the apparatus and deposited, for example in a shipping container.

Figure 1:
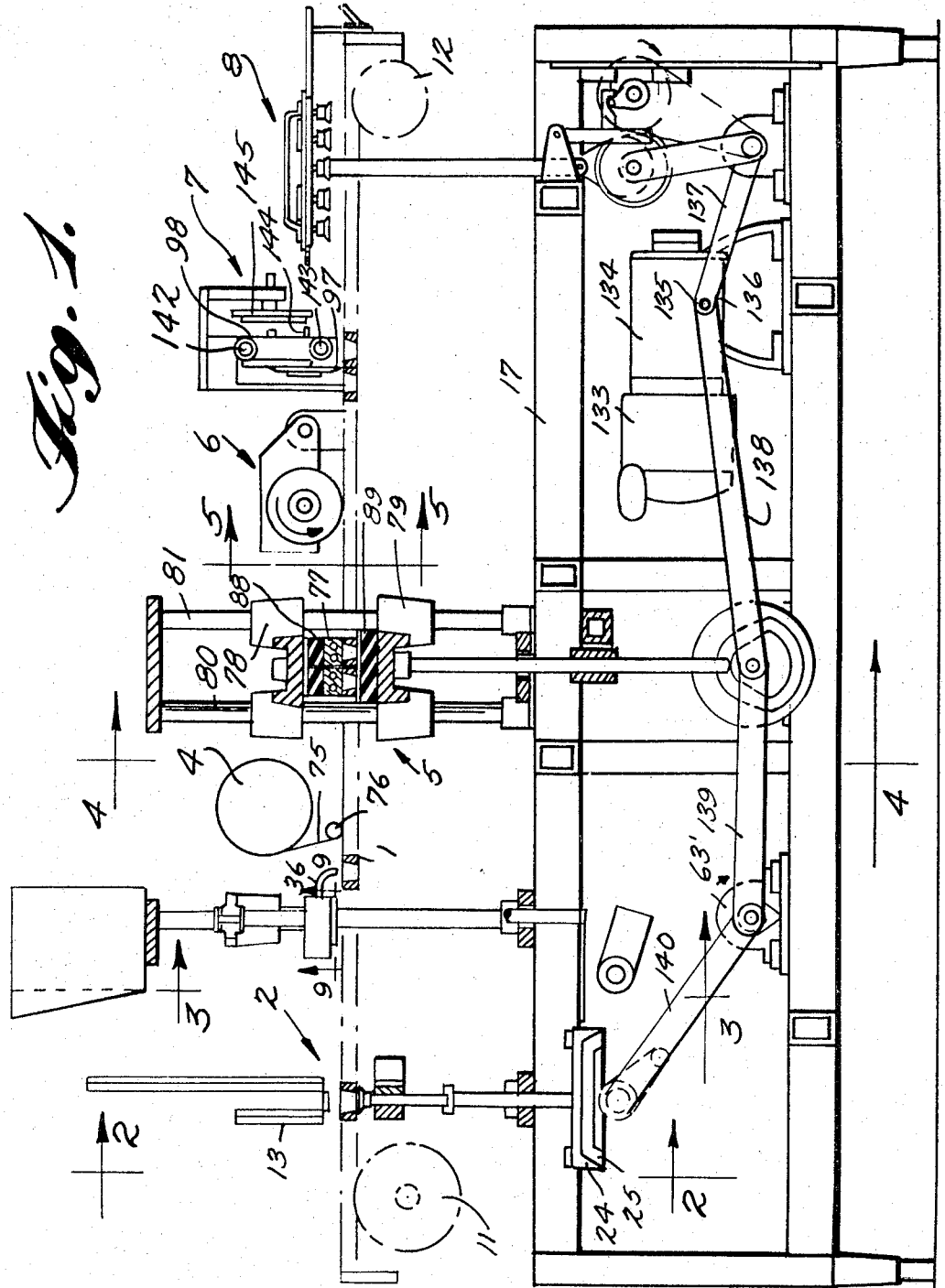

The present invention pertains to an apparatus for filling preformed receptacles and sealing a cover over the filled receptacles. A principal type of receptacle for which the invention is useful is the type containing individual portions of condiments or spreads supplied with food servings, for example on commercial airlines and in restaurants. In accordance with the invention, small preformed receptacles are transported in groups past a filling station, the group is covered by a sheet of a foil, the foil is hermetically sealed, for example by heat, to the receptacles, a cutting means severs the covering between the receptacles, then several of the aforesaid groups are allowed to accumulate at a discharge station. When an appropriate number of groups are accumulated, the closed packages are collectively removed from the apparatus and deposited, for example in a shipping container.

An important object of the invention is high overall speed of operations. The time required for the respective operations are not the same. Thus filling the receptacles proceeds rather quickly while heat sealing the foil to the receptacles takes more time, and discharge of cups even more. Most of the operations in apparatus of this type are performed while the receptacles are stationary and the receptacles are moved stepwise to the respective stations where they remain until it is time to move other receptacles into the same positions. The stopping time is necessarily the same, so that it is determined by the slowest operation.

In accordance with the present inventions, certain slower operations are repeated while the receptacles are in successive positions, and means are provided to permit moving the line of receptacles while certain operations are carried out to permit an overall increase in speed of packaging.

A preferred form of the apparatus is illustrated in the drawing. For conveniencee in understanding, some parts are omitted from certain figures in the drawing.

Figure 2:
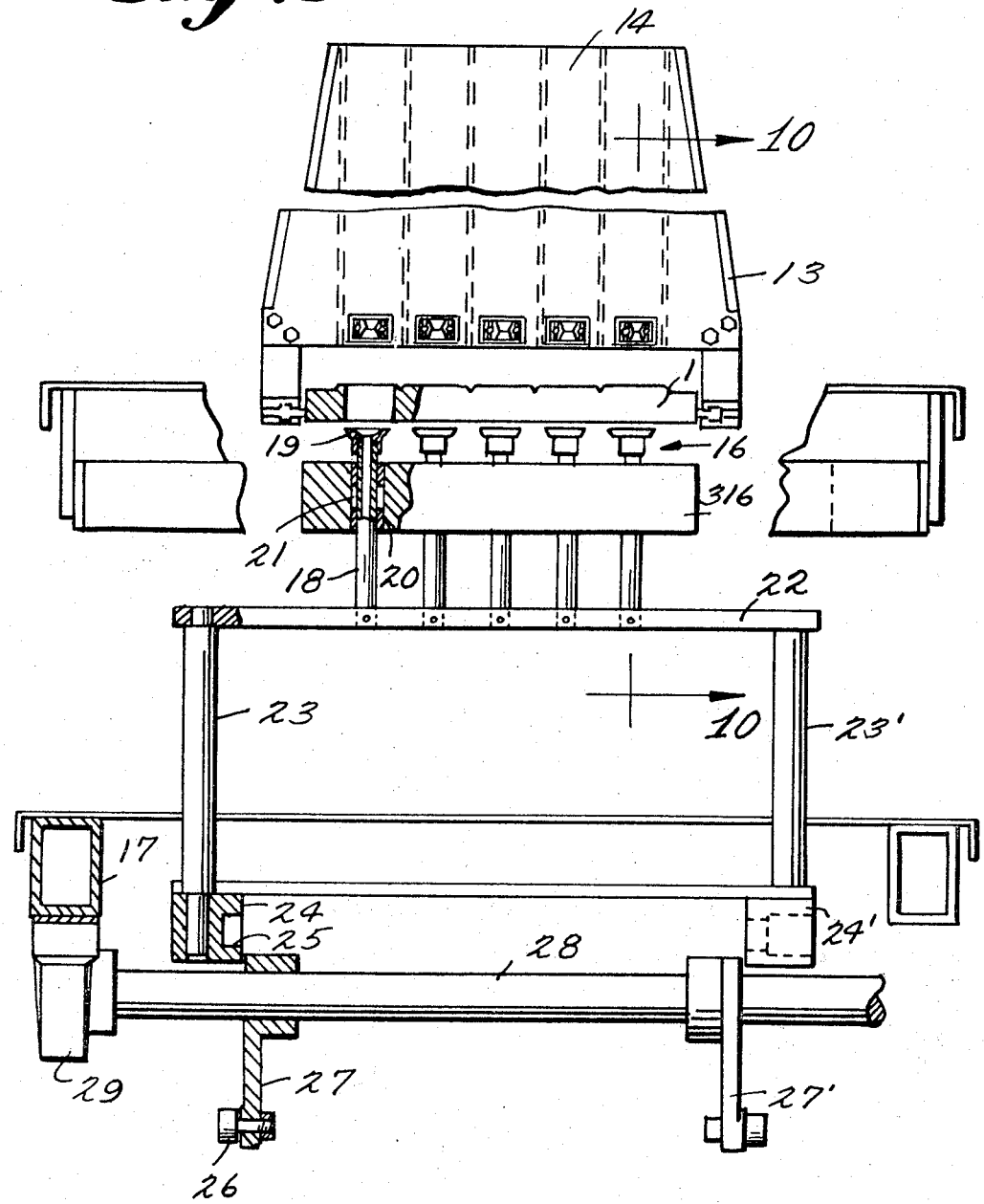
Figure 3:
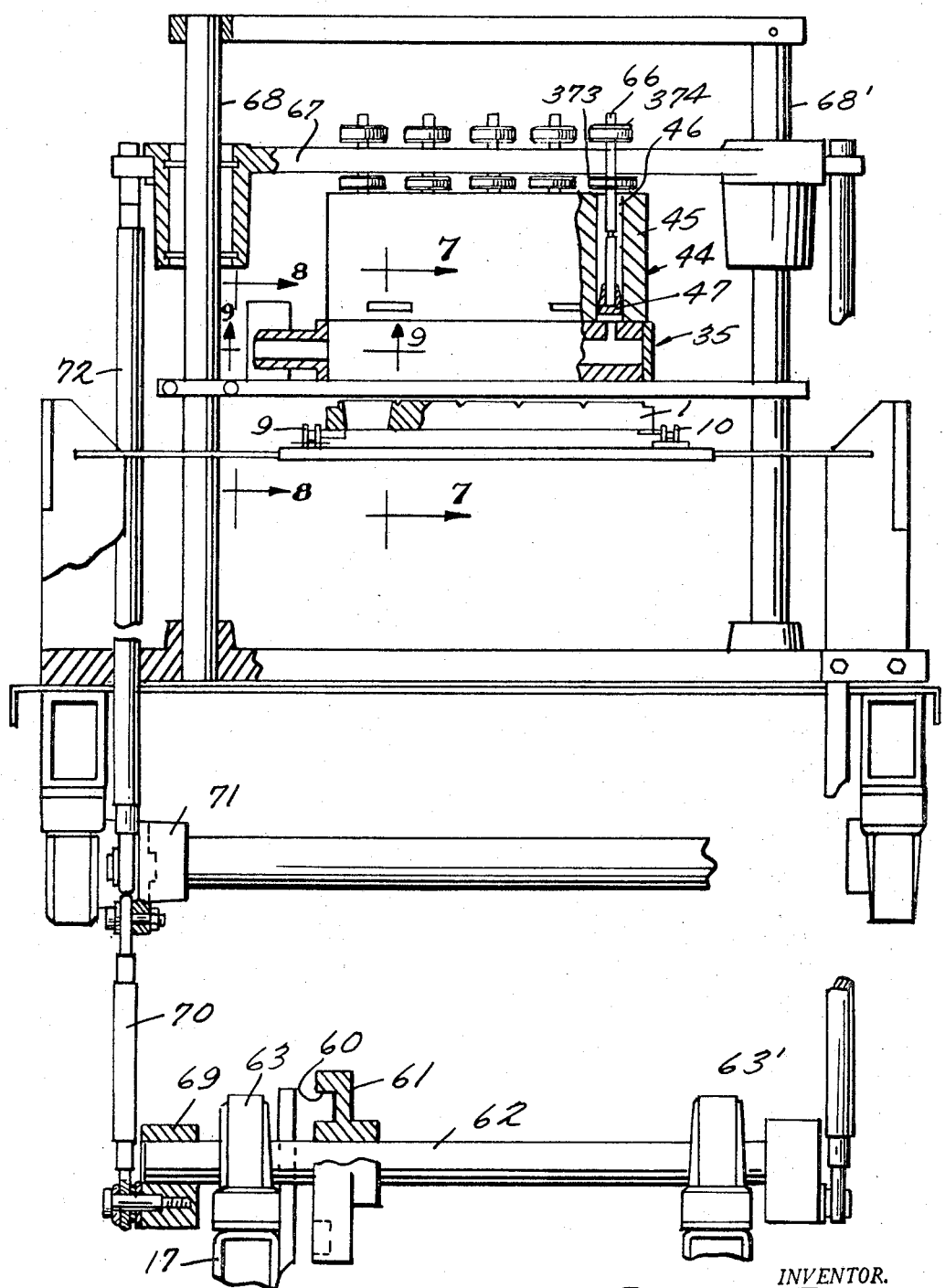
Figure 4:
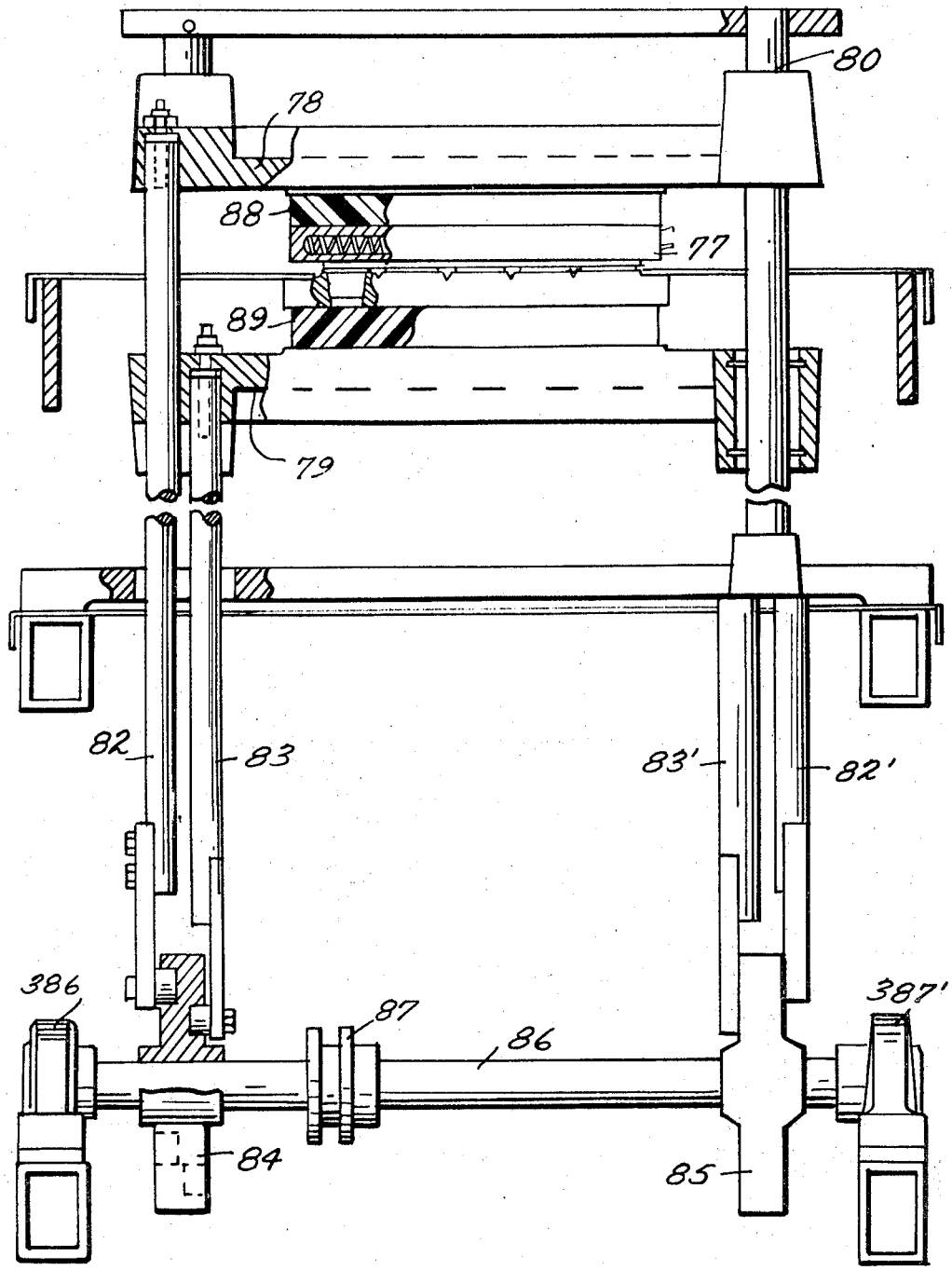

FIG. 1 is an elevation of the apparatus, some parts being shown schematically for better understanding;
FIG. 2 is a section along line 2–2 of FIG. 1;
FIG. 3 is a section along line 3–3 of FIG. 1;
FIG. 4 is a section along line 4–4 of FIG. 1;
FIG. 5 is an elevation of the machine direction slitters for slitting the cover material, viewed along line 5—5 of FIG. 1;
FIG. 6 is an elevation of the mechanism for opening and closing the valve supplying a product to the receptacles at the filling station;
FIG. 7 is a partial section along line 7–7 of FIG. 3;
FIG. 8 is a partial section along line 8–8 of FIG. 3;
FIG. 9 is a partial section along line 9—9 of FIG. 3;
FIG. 10 is a partial section along line 10—10 of FIG. 2;
FIG. 11 is a perspective view of a receptacle carrier for transporting a group of receptacles through the apparatus;
FIG. 12 is a section along line 12–12 of FIG. 11;
FIG. 13 is a perspective view of a receptacle for use in the apparatus;
FIG. 14 is an enlarged view of the portion of the apparatus where completed packages are discharged;
FIG. 15 is a section along line 15–15 of FIG. 14;
FIG. 16 is a section of a part of the apparatus along line 16—16 of FIG. 14; and
FIG. 17 is a plan view of a part of the portion of the apparatus shown in FIG. 14.

The apparatus includes a conveyor which transports a plurality of carriers 1, seen in FIG. 11 past a plurality of stations where various operations are performed. Referring to FIG. 1, the numeral 2 indicates a denesting station for withdrawing individual receptacles from a stack and placing them in the carriers 1, 3 indicates generally a filling station where a measured amount of e.g. jelly is placed in each receptacle, 4 indicates a roll of flexible covering material for the receptacles, 5 indicates a heat sealing station where the flexible covering is sealed to the individual receptacles, 6 indicates a machine direction slitter and 7 a transverse slitter to sever the flexible covering between receptacles, and 8 indicates a suction device for lifting the closed packages from a plurality of carriers 1 and moving the packages to a remote position where suction is released and the closed packages are dropped, e.g. into a shipping carton.

The carriers 1 are attached to endless chains 9 and 10, seen in FIG. 3, at opposite sides of the path of movement of the carriers. The chains are trained around sprocket wheels 11 and 12. One of the sprocket wheels is driven intermittently by means, not shown, so that each of the carriers 1 is stopped momentarily at each of the respective stations. Thus a carrier is first positioned at the denesting station 2 where a plurality of receptacles are received. Then, the carrier is positioned at the filling station 3 where a measured quantity of product is placed in each receptacle. As the carrier moves to the heat sealing station, a flexible covering is applied from the roll 4, which is heat sealed to the receptacles at the station 5. The machine direction slitter then severs the flexible covering between the receptacles in each carrier, i.e. into strips of flexible covering running lengthwise of the apparatus. At the transverse slitter 7, these strips of flexible covering are severed between adjacent carriers, so that there is a rectangle or square of flexible covering on each receptacle. Finally, the closed packages are removed from the carriers at station 8. A plurality of carriers, five in the embodiment illustrated, is allowed to accumulate at this station, and then a suction device is lowered onto the packages. Suction is applied to the coverings of the respective packages, and the device is then raised. The suction device is slidable on a track to a remote position, and an operator moves it to this position. There, the suction is released, and the packages are dropped.

To facilitate understanding the structure and operation of the apparatus, each of the stations will now be discussed separately.

The denesting station 2 is illustrated principally in FIGS. 1, 2 and 10. There is mounted over the line of carriers 1 a hopper 13 having a plurality of vertical tubes 14 positioned over the respective openings in the carriers 1.

Stacks of cups 15 of the type shown in FIG. 13 are held in each tube. The walls of each tube may be inclined slightly outwardly and upwardly so that only the lowermost receptacle is frictionally engaged. This arrangement assures that only one receptacle is removed at a time. Below the line of carriers 1 there are vertically reciprocating suction members indicated by the number 16 which are raised against the receptacles, apply suction, and pull the receptacles into the carrier.

The vertically reciprocating suction members are slidably mounted in a block 316 which is mounted to the frame 17 of the apparatus by means not shown. Each suction member comprises a tube 18 which is closed at its bottom but open at the top. A rubber suction cup 19 is mounted at the top of each tube. Within the block 316, each tube slides in a bearing 20 which is split at its center to provide an opening 21 leading to the tube 18. Suction is applied to the opening 21. Each tube also has an opening 321 through its side wall which aligns with the opening 21 when the suction cup 19 is raised against a receptacle 15. Then as the tube 18 and the suction cup 19 are lowered, this opening through the wall of the tube 18 is lowered below the block 316, permitting air to be introduced into the tube to release the suction when a receptacle has been lowered into place in the carrier 1.

The bottoms of the five tubes 18 are fastened to a horizontal bar 22 which is mounted at the tops of vertically reciprocating posts 23 and 23'. There are cams 24 and 24' secured to the bottoms of the posts 23 and 23', each having a cam track 25 (seen in FIG. 1) which engages a pin 26 at the distal end of a crank 27. The crank is mounted on a shaft 28 journaled in pillow blocks 29 mounted to the frame 17. The shaft 28 is rotated in synchronism with the movements of other parts of the apparatus so that the pin 26 moves through the cam track 25 and elevates the posts 23 and 23' causing upward and downward movement of the suction cups 19. The upward and downward movement of the suction cups is synchronized with the timing of the apparatus so that this movement takes place when a carrier 1 is in position beneath the hopper 13 so that the tubes 18 move upwardly through openings 33 in the carriers.

Referring to FIG. 13, it will be noted that each cup has a bottom 30, sidewalls 31 and an outwardly extending flange 32 at the tops of the sidewalls. As can be seen in FIGS. 11 and 12, the carrier 1 has a plurality of openings 33 slightly wider than the transverse dimensions of the main parts of the receptacle 15. At the upper ends of the openings 33 there are ledges 34 on which the flanges 32 of the receptacles are seated.

The filling station 3 is principally illustrated in FIGURES 1, 3, 6, 7, 8 and 9. At the filling station a food product is dispensed from a filler valve indicated generally by the numeral 35 through spouts 36 which are tubes opening immediately above the receptacles. The valve 35 comprises a block 37 and a core 38 journaled in a horizontal circular opening 39 running the length of the block. There is another circular opening 40 running the length of the block parallel to the opening 39 and which is an inlet pipe for the food product. Five openings 41 connect the openings 39 and 40 and five openings 42 connect the opening 39 with the spouts 36. The core 38 rotates on its axis and transfers a metered quantity of food product from the inlet pipe 40 to the spouts 36. The core 38 is a cylinder having five grooves 43 aligned with the openings 41 and 42, the grooves 43 providing between the core 38 and the block 37 a predetermined volume. Above the block 37 there is provided a pump indicated by the numeral 44 comprising a block 45 having five vertical cylinders 46 and pistons 47 reciprocally slidable in the respective cylinders. There are five openings 48 through the block 37 in alignment with the openings 41 and 42 and extending upwardly from the openings 39 to the top of the block 37. These openings also are in alignment with the cylinders 46 so that upward and downward movement of the pistons 47 provides suction and compression to the grooves 43. The blocks 45 and 37 are locked together to form a relatively gas-tight seal, by means of the cam lock 49 seen in FIG. 7.

The core 38 is rotatable in the opening 39 and is rocked back and forth between a position where the groove 43 communicates with openings 41 and 48 and a position in which the groove 43 communicates between openings 42 and 48. The means for accomplishing this is illustrated in FIGS. 6 and 9. The core 38 has a reduced diameter extension 50 at one end and this is connected by a coupling 51 to the shaft 52 of a pinion 53. The pinion 53 meshes with a rack 54 which is reciprocated vertically by means illustrated in FIG. 6. The rack 54 is at the upper end of the vertical rod 55, which has its bottom end pivotally mounted to one end of a link 56. The other end of the link 56 is pivotally mounted to one end of a rocker arm 57. The other end of the rocker arm 57 is pivotally mounted to a support 58 which is welded or otherwise permanently secured to the frame 17. The arrangement is such that upward and downward movement of the rocker arm 57 is transmitted through the link 56 and the connecting rod 55 to the rack 54 rotating the pinion gear 53 and reciprocating the valve core 38. There is a pin mounted at about the middle of the rocker arm 57 which travels in a cam track 60 milled into one side of a circular disc 61. The circular disc 61 is pinned to a shaft 62 journaled in a pair of pillow blocks 63 and 63' which are bolted or otherwise secured to the frame 17. The shaft 62 is rotated by means to be described hereinafter. As can be seen in FIG. 6, the cam track 60 comprises two circular segments 64 and 64', the segment 64 having a smaller radius than the segment 64'. The two segments are connected by other segments 65 and 65' to provide a rather abrupt transition between the segments 64 and 64'. When the pin 59 is located in the segment 64, the rocker arm 57 is in its lower position, and the valve core 38 is rotated to its discharge position so that the groove 43 communicates with the opening 42 and the spout 36. Then, as the disc 61 continues to rotate (counterclockwise as viewed in FIG. 6) the pin rides through the segment 65' to the cam track segment 64' which raises the pin 59 to its higher position. This rocks the valve core 38 to its filling position, wherein the groove 43 communicates with the opening 41 and the inlet tube 40. As the disc 61 rotates further, the pin 59 moves through the cam track segment 65 to the segment 64 which lowers the pin 59 and again moves the valve core 38 to the discharge position. There is an abrupt movement of the valve core between its extreme positions and then it is maintained in its extreme positions for most of the time in each cycle. This will be apparent from an examination of the shape of the cam track 60.

The pump mechanism 44 is operated by moving the pistons 47 vertically in the cylinders 46. There is a connecting rod 66 at the top of each piston which extends upwardly through the block 45 and through openings in a horizontal bar 67 above the block. The bar is slidably mounted for vertical reciprocating movement on two upright posts 68 and 68' at opposite sides of the frame. It is moved up and down by cranks 69 fixed to the shaft 62 and rotating with it, through a link 70, a secondary crank 71 and a link 72.

There are nuts 373 and 374 threaded on the connecting rod 66 respectively below and above the horizontal bar 67. These may be adjusted to allow a small amount of free play. Thus, rotation of the shaft 62 is transmitted through the cranks 69 and other means just described to provide upward and downward movement of the pistons 47.

The synchronization of the crank 69 and the disc 61 is such that the upward and downward movements of the pistons 47 are not exactly in cycle with the rocking of the core 38 in valve 35. Thus, when the valve is in its discharge position, the upward movement of the pistons 47, which creates a suction, is commenced about .01 second before the valve begins its return to its filling position. This generates a suction through the groove 43, the opening 42 and the spout 36. Any material in the spout 36 which has not dropped into a receptacle is sucked slightly into the spout. At the same time, the carriers 1 are moved to their next position, placing the next receptacle under the spout. This arrangement tends to prevent dripping of material from the spout 36 while the carriers are moving from one position to the next and all of the food product goes into one of the receptacles rather than being dripped onto the apparatus while the receptacles are moving. To aid in reducing dripping, the lower end of the spout 36 is bent back rather than being vertical and perpendicular to the horizontal portion of the spout to provide a small angle 74 between the vertical and the center line or axis 335 of the lower portion of the spout. In addition, the lower end of the tube which constitutes the spout 36 is cut at a slight angle 336 to the axis of the tube, so that the opening is a little closer to the horizontal than an imaginary line 337 perpendicular to the center line 335. The net effect is that there is a small angle 73 between the horizontal and the mouth of the opening at the bottom of the spout, but this is less than the angle 74. These angles have been exaggerated in FIG. 7, but ordinarily they are respectively about 2 and 5°.

After the predetermined quantity of food product is discharged into the receptacles in the carrier 1, the carrier is moved past the roll of covering material 4. A thin film or foil of covering material, for example aluminum foil 75, moves from the roll 4 under a roller 76 and is laid on top of the filled receptacles. The covering material is, at the next station, heat sealed to the receptacles, so that movement of the receptacles will of itself tend to pull the foil or film along and unwind the roll 4. However, a tension device and/or positive feed may be used, as is known in the art, to apply the film or foil properly to the receptacles.

The heat sealing station is illustrated principally in FIGS. 1 and 4. It comprises an electrical heater 77 and means to press the electrical heater and the receptacles against the foil 75 so that heat is applied to the covering material which causes it to adhere to the receptacles. Heat sealing may be accomplished, if the receptacles and the covering material both are a thermoplastic material, by a melting or softening of the thermoplastic. It also is possible to apply a heat activated adhesive either to the receptacles or to the covering material, which is caused to fuse and become adhesive through the application of heat. Heat-activated adhesives are useful, for example, when one of the materials to be sealed is a metal foil such as aluminum or steel foil.

As seen in FIG. 4, the pressure means comprises a pair of platforms indicated by the numerals 78 and 79 and positioned respectively above and below the carriers 1. The platforms 78 and 79 are mounted for vertical reciprocating movement on posts 80 and 81 and similar posts on the opposite side of the apparatus. The posts are fixedly secured to the frame 17. Vertical movement of the platforms is provided by means of cranks 82, 82′, 83 and 83′ carrying pins at their lower ends which are guided in cam tracks milled into the surfaces of discs 84 and 85 which are fixed to a shaft 86. The shaft is journaled in pillow blocks 386 and 386′ mounted on the frame. The shaft also carries a wheel 87 so that it may be rotated by means to be described hereinafter.

On the bottom of the platform 78 there is mounted an elastomeric member 88 below which is mounted an electrical heater 77. A similar elastomeric member 89, i.e. of the same type of material and the same thickness, is mounted on the top of the platform 79. The platforms are lowered and raised in synchronism and the elastomeric members 88 and 89 have approximately the same resiliency. Therefore, they tend to compensate for each other and, while pressure is applied to the packages, there is no net movement of the carriers 1 under the pressure. It is known to use one resilient member between the heater and the press to assure uniform pressure and a good seal. However, this may result in uneven pressure and movement of carriers and packages in the present apparatus, and the use of two resilient members is considered quite desirable.

The heater is equal in width to two of the carriers. Therefore, heat is applied when a carrier enters the heating station, and then, when the carriers are indexed to their next position, the heat is applied to the package again. This assures that there will be sufficient heat applied. Since the heat sealing step requires more time than filling the receptacles, the use of two heating stations side by side permits a relatively long heating cycle and yet rather rapid movement of the carriers through the apparatus.

The machine direction slitter shown in FIG. 5 comprises four circular knives 90, 91, 92 and 93 mounted fixedly on a rotatable shaft 94. The shaft is journaled in bearings at the sides of the apparatus and carries a gear 95 at one end meshed with another gear 96. The gear 96 is driven by the common power source for the apparatus, and turns gear 95 in opposite direction. The effect is that the rotation of the knives, as seen in FIG. 1, is counterclockwise so that the lower edges of the blades are moving in the same direction as the packages.

The transverse slitter indicated generally by the numeral 7 in FIG. 1 comprises a knife 97 mounted for rotation on a shaft in a carriage 98 which moves transversely across the apparatus. The carriage moves across the apparatus when the carriers are stationary, and the knife blade 97 is rotated and slits the cover material between adjacent carirers. One transverse movement of the carriage is accomplished while the carriers are stationary, the carriage 98 is held at the opposite side of the apparatus while the carriers are advanced to their next position, and then the carriage 98 moves back across the apparatus again to its original position. Thus, the knife blade 97 severs the foil material between two pairs of adjacent carriers in each cycle. This permits synchronization with other operations. If the carriage were to be returned to its original position before the carriers were advanced to their next position, it would have to move more quickly or the overall operation would have to be slowed.

The suction device indicated by the numeral 8 in FIG. 1 is a device to enable an operator to remove a large number of completed packages from carriers and transfer them to another position without interrupting the continuous operation of the equipment. In the embodiment shown, there are twenty-five suction cups indicated by the numberal 99, arranged in five rows, and aligned with the completed packages in five of the carriers 1. From considering the following description, it will be appreciated that the number of suction cups may be varied for use with the packages in a greater or smaller number of carriers, depending principally on the speed of the equipment.

The suction cups 99 are mounted below a sliding plate 100 which has a handle 101 for an operator to move it from a position above the carriers 1 to a remote position 102. The plate 100 slides lengthwise of the apparatus, on a pair of tracks 103 and 103′. Each track is divided into two segments 104 and 105, the segment 104 being vertically recriprocable by means described below, and the segment 105 being stationary. In use, when five carriers 1 are in position below the plate 100, the track segment 104 is lowered, bringing the suction cups 99 against the tops of the packages. Suction is applied to the cups, and then the track segment 104 is raised again, the completed packages being lifted with it. When the track segment is at its top-most position, the operator slides the plate 100 to the remote position 102. Automatic means may be provided to accomplish this movement, if desired. At this point, the suction is automatically released by microswitch 305 which operates a valve (not shown), and the completed packages drop, for example into a waiting carton below. Preferably, the microswitch-operated valve replaces the suction with a positive pressure to drop the packages more quickly. Then the operator returns the plate 100 to its position on the track segment 104. In the meantime, the other portions of the apparatus have continued to operate, and other carriers have been moved below the suction cups 99 with more completed packages. When there are five carriers filled with completed packages below the suction cups 99, the cycle is repeated.

The means for lowering and raising the track segment 104 comprises a set of four guides which may simply be channel steel elements 106, 107, 108 and 109 seen in FIGURE 17. Runners 110, 111, 112 and 113 are secured to the corners of the track segment 104 and are slidable in the guides 106–109. In addition, connecting rods 114 and 115 are pivotally mounted at the edges of the track segments 104, the connecting rods being moved upwardly and downwardly by means illustrated in FIGURES 14–16.

The means there illustrated comprises a pair of parallel shafts and a single revolution clutch which is actuated on every fifth cycle of the apparatus. One of the shafts operates at a speed of one revolution per cycle while the other shaft operates at reduced speed of one revolution every five cycles. The slower shaft releases the single revolution clutch once during each of its revolutions. As seen in FIGURE 15, the faster shaft 116 is journalled in a pair of pillow blocks, one of which is indicated by the numeral 117, attached to the frame 17.

On shaft 116, there are mounted two cams having grooved surfaces which receive pins (not shown) on the lower ends of the connecting rods 114 and 115. The grooves are eccentric with respect to the shaft 116 so that rotation of that shaft causes vertically reciprocating movement of the pins and hence the track segment 104.

Also mounted on shaft 116 is a single revolution clutch 119 of the known type carrying a pulley 120 and a flywheel 121 which is connected to the shaft 116. The flywheel has a notch 122 so that the shaft 116 cannot turn and the clutch is disengaged when a pawl is in the notch. A pawl is indicated by the numeral 123 and it is mounted near the bottom of a swinging arm assembly 124. The assembly comprises a pair of arms 125 and 125', each pivotally mounted near its top to the frame 17. The arms are connected by a cross brace 126 which also carries an outwardly extending, horizontal, open bottom hook member 127. The arrangement is such that the assembly 124 swings away from shaft 116 when the hook 127 is pulled, thus removing the pawl 123 from the notch 122. This causes the clutch 119 to be engaged and the shaft 116 is rotated. The shaft continues to rotate until the assembly 124 swings back towards the flywheel 121 and the pawl 123 drops into the notch 122.

The more slowly rotating shaft 128 is mounted for rotation parallel to shaft 116 and carries a sprocket wheel 129 connected by a chain trained around a sprocket wheen (not shown) mounted on an idler shaft 131 which also carries a pulley which drives pulley 120. The drive pulley and the sprocket wheel on shaft 131 are of the same diameter, but sprocket wheel 129 has a diameter five times the diameter of the pulley 120. Therefore, the speed of shaft 128 is one-fifth the speed of shaft 116.

Shaft 128 also carries a radially extending arm 130 which rotates with the shaft, and there is a boss 132 extending laterally from the distal portion of arm 130. The Boss 132 engages the hook 127 as the shaft 128 rotates, it pulls and lifts the hook and swings the assembly 124 thus releasing the single revolution clutch 119. Then, as shaft 128 continues to rotate, the boss 132 moves out of hook 127 allowing pawl 123 to swing back against flywheel 121. When the notch 122 is again adjacent the pawl, the flywheel is automatically engaged. If desired, the assembly 124 may be weighted or spring-loaded to urge it into the notch. The hook 127 is released before the shaft 116 makes one revolution, so that the suction device is lowered only once in each five cycles of the machine. This allows sufficient time for the operator to transfer the cups without interrupting continuous operation of other stations.

Power to all stations is supplied by an electric motor having a reduction gear set 134 through an output shaft 135 carrying a sprocket wheel 136. A chain 137 connects to the drive sprocket wheel on idler shaft 131. Another sprocket wheel on shaft 135 drives a chain 138 trained around one of the sets of sprockets on wheel 87. Another chain 139 is driven by the other set of sprockets on wheel 87 and is trained around one set of sprockets on a wheel, not shown, on shaft 62. The other set of sprockets drives a chain 140 trained around a sprocket wheel on shaft 28 to operate the denesting station.

The same power source operates the slitters. Thus the machine direction slitter 6 is driven through gears 96 and 95 by a sprocket wheel 141 which engages chain 9. The transverse slitter carriage 98 slides on rods 142 and 143 and has a vertical raceway receiving a pin 144 carried on a link of an endless chain trained around a large sprocket wheel 145 at one side of the frame and a similar sprocket wheel on the opposite side. When one of the sprocket wheels is rotated by means not shown the pin 144 moves back and forth above the carriers 1, but when the pin is moving vertically on one of the sprocket wheels the carriage 98 is held at one side or the other. The latter is synchronized with the movement of the carriers from one position to the next.

It can be seen that the denesting and filling operations require less time than others. In accordance with the invention, the heat sealing operation and the cyclic movement of the transverse slitter are divided into two parts, each corresponding to a single cycle of the apparatus. Similarly, the initial removal of completed packages is carried out during every fifth machine cycle so that the packages may be transferred during the other four cycles. As a result, the faster operations can proceed at high speed without interruption.

The principles of the invention have now been explained and illustrated with a detailed description. However, it will be appreciated that various changes may be made be made in details of construction and mode of operation without departing from the scope of the invention, as defined in the appended claims.

I claim:
1. Apparatus for transporting packages comprising
   a conveyor for transporting a plurality of packages arranged along a horizontal path of movement of the conveyor,
   means for applying intermittent motion to said conveyor to transport said packages to a plurality of positions along the path of movement of said conveyor and for stopping said conveyor with said packages at said positions
   and means for removing said packages from said conveyor, said last-mentioned means comprising means for substantially simultaneously attaching to a plurality of said packages along said path, means for removing said attaching means with said packages away from said conveyor while said conveyor is stopped and then returning said attaching means to said conveyor to attach to another plurality of packages only after said conveyor has moved another plurality of positions,
   whereby said removing means can transfer said packages to a remote point before removing additional packages from said conveyor without interrupting continued operation of the conveyor,
   said attaching means comprising a plurality of suction devices on a support member above said conveyor and aligned with a plurality of said positions and means for applying suction when said suction devices are against said packages, said support member being supported by vertically reciprocating horizontal track means on which said support member is slidable and said removing means includes means for lowering and raising said reciprocating horizontal track means towards and away from said conveyor and stationary horizontal track means on which said support member is slidable, aligned with said movable track means when said movable track means is away from said conveyor, whereby when said attaching means is removed from said conveyor, said support member may slide along said stationary track means to said remote point for discharge of said packages.

2. Apparatus as set forth in claim 1 including means for releasing suction when said packages are at said remote point.

3. Apparatus for filling and closing a plurality of receptacles comprising a conveyor for said receptacles, said conveyor comprising a plurality of carriers each having spaced openings along a line transverse to a path of movement of the conveyor for receiving a plurality of receptacles and flexible ligaments attached to said carriers at opposite sides of said path, means for applying intermittent motion to said ligaments to transport said carriers to a plurality of positions along said path and stop each of them at each of said positions, means at a first station at one of said positions for placing receptacles in said openings in said carriers, means at a second station at one of said positions for placing a product in said receptacles, means for applying a continuous covering to said receptacles at a third station, sealing means at a fourth station along said path for pressing said covering and said receptacles together and applying heat to cause them to be sealed together while they are stopped, said heat sealing means then retracting to permit said receptacles to move to the next position, said heat sealing means being adjacent at least two of said positions so that said receptacles are pressed to said covering and heated at least twice to insure an adequate seal without increasing the time said carriers are stopped at said positions, first slitting means comprising a plurality of cutters spaced across said path between said openings to sever said covering between adjacent receptacles in each of said carriers, second slitting means comprising a cutter and means for moving said cutter across the path of said carriers, while said carriers are stopped, from one side of said path to the other side, holding said cutter on said other side until said carriers have moved to the next position and then moving said cutter back across said path while said carriers are stopped at said next position, and means for removing said packages from said conveyor, said last mentioned means comprising a plurality of suction devices on a support member above said conveyor and aligned with the packages in a plurality of said carriers, vertically reciprocating horizontal track means supporting said support member, means for lowering and raising said reciprocating horizontal track means toward and away from said conveyor to bring said suction devices toward and away from completed packages in said carriers, means for applying suction to said suction devices when they are in contact with said packages, stationary horizontal track means on which said support member is slidable, aligned with said reciprocating track means when said reciprocating track means is away from said carriers, whereby when said support member is removed from said conveyor, said support member may slide along said stationary track means to a remote point for discharge of the packages, and means for releasing suction in said suction device when said packages are at said remote point.

References Cited

UNITED STATES PATENTS

| | | | |
|---|---|---|---|
| 1,968,190 | 7/1934 | Clark | 53—33 |
| 2,103,817 | 12/1937 | Johnson | 141—116 |
| 2,324,443 | 7/1943 | Walter | 141—116 X |
| 2,958,168 | 11/1960 | Vogt | 53—373 X |
| 2,970,414 | 2/1961 | Rohdin | 53—184 X |
| 3,328,937 | 7/1967 | Newman et al. | 53—282 |
| 3,330,092 | 7/1967 | Hill | 53—282 |
| 3,342,010 | 9/1967 | Henry | 53—282 X |

THERON E. CONDON, *Primary Examiner.*

R. L. SPRUILL, *Assistant Examiner.*

U.S. Cl. X.R.

53—247, 373; 141—116; 198—20